Feb. 10, 1970  R. F. CLEMENS  3,495,254
SEDIMENTATION APPARATUS HAVING VERTICALLY
STACKED SETTLING COMPARTMENTS
Filed March 24, 1969  3 Sheets-Sheet 1

INVENTOR.
ROBERT F. CLEMENS
BY Theodore M. Jablon
ATTORNEY.

INVENTOR.
ROBERT F. CLEMENS
BY Theodore M. Jablon
ATTORNEY.

FIG. 4
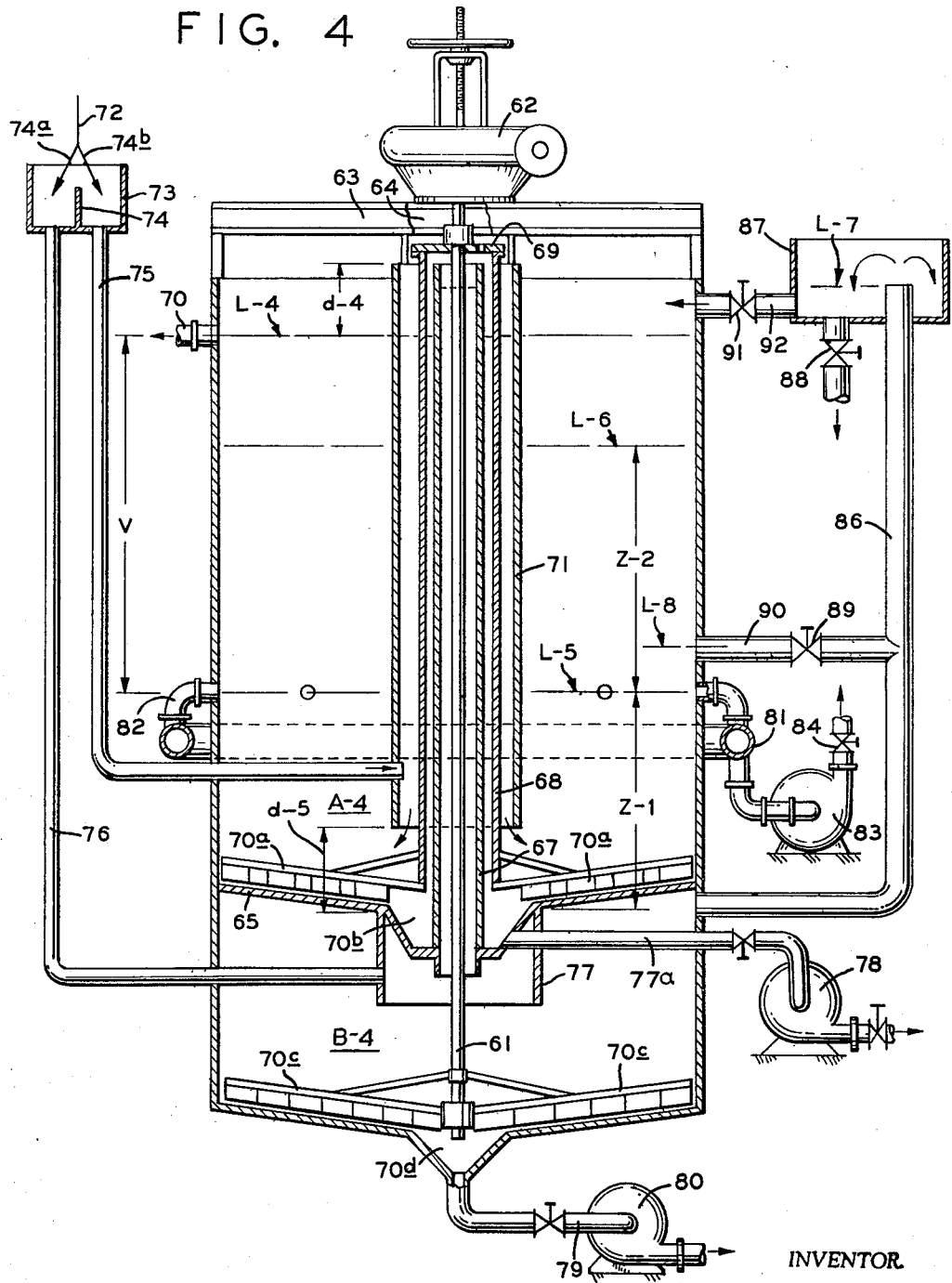
INVENTOR.
ROBERT F. CLEMENS
BY 
ATTORNEY.

United States Patent Office 3,495,254
Patented Feb. 10, 1970

3,495,254
SEDIMENTATION APPARATUS HAVING VERTICALLY STACKED SETTLING COMPARTMENTS
Robert F. Clemens, Norwalk, Conn., assignor to Dorr-Oliver Incorporated, Stamford, Conn., a corporation of Delaware
Filed Mar. 24, 1969, Ser. No. 809,566
Int. Cl. B01d 21/14
U.S. Cl. 210—522                                              9 Claims

ABSTRACT OF THE DISCLOSURE

A sedimentation apparatus having two vertically stacked settling compartments operable as individual units independent of each other hydraulically, but with a single rotary rake structure provided with a common rake shaft, equipped with an improved seal for the shaft which comprises an upstanding stationary tube rising from the upper compartment bottom and extending above both compartment liquor levels and a depending tube surrounding the upstanding tube concentric with the shaft and fixed thereto at its upper end, and carrying the rake arms for the upper settling compartment.

---

This invention relates to sedimentation apparatus or settling tanks for the thickening or clarification of suspensions and slurries, or pulps, whereby the thickened material in the form of mud or sludge is continuously withdrawn from the tank, while the separated or clarified liquor overflows. In the operation of these tanks, the rotating rake structure continually moves the settled solids or mud over the tank bottom to a centrally located collecting zone for withdrawal from the tank.

Such settling tanks require a settling area dimensioned for a given rate of feed supply, and based upon the settling characteristics of the suspension, slurry, or pulp to be treated. The efficiency of the tank depends upon how well the available settling area is utilized while attaining a desired clarity in the overflow as well as a desired concentration of the mud. Hence, the efficiency depends upon how well the feed rate and the rate of sludge withdrawal are being observed and controlled.

Whereas such operating control for the sake of tank efficiency can be most positively and readily exercised in the operation of a single tank having a single overflow, a single sludge withdrawal, and a single set of rake arms operating on the tank bottom, this invention is concerned more particularly with improvements in the so-called tray thickeners wherein a required settling area is provided by the bottoms of a plurality of vertically stacked settling compartments, served by a common rake shaft extending vertically through all the compartments, and carrying sets of rake arms operating on the respective compartment bottoms.

While such tray type thickeners or compartmented tanks may save valuable floor space, they do present problems due to the necessity of providing sludge sealing means around the rake shaft in order to prevent short circuiting or intermixing between the compartments. Because of the inaccessibility of these internal seals, there is no positive assurance whereby their working condition and their effectiveness might be ascertained, irrespective of whether they be mechanical seals or in the nature of the so-called mud seals that must have their overflow levels hydraulically balanced by controlling the operation of the vertically stacked settling compartments relative to one another. Hydraulic balancing requires operator's attention to adjust overflow levels.

The mechanical seals are subject to wear and tear, while the hydraulically balanced mud seals require more or less critical operating control which makes it practically difficult to operate the respective settling compartments at optimum single-tank efficiency. The settling compartments are therefore usually overdimensioned, in order that certain requirements of clarity of the overflow liquors and of solids concentration of the sludge may be attainable and maintainable.

An example of a mud seal type two-compartment tray thickener is shown in the U.S. Patent to Logue No. 2,402,649 and 2,460,834.

This invention provides a tray type thickener so constructed as to eliminate the above stated sealing and—and operation problems, while allowing a top settling compartment to be operated entirely independently from a second compartment directly below, and both compartments to be operated at independently controllably optimum—or single tank efficiency.

According to this invention, and in view of the above stated problems, each of two settling compartments has its independent feed connection sludge withdrawal means, and discharge means for delivering the clarified liquor fraction. The seal for the shaft although nonmechanical excludes the possibility of hydraulic transfer between the compartments.

The rake shaft extends freely through a central opening in the tray or bottom of the top compartment. This opening is connected to the lower end of an upstanding tube concentrically surrounding the shaft, and extending upwardly to a point above the overflow levels of both compartments. A depending tube carrying rake arms for the top compartment, surrounds the upstanding tube concentric with the axis of the shaft, and has its upper end rigidly connected to the shaft at a point spaced upwardly from the top end of the upstanding tube. Rotating this shaft will cause the rakes in the top compartment to move the sediment or sludge over the bottom into an annular collecting zone or sump surrounding the foot end of the upstanding tube, for withdrawal through a discharge pipe. Sludge in the lower compartment is similarly collected and withdrawn incident to the rotation of the rake structure.

The two superposed compartments are thus rendered functionally entirely independent of each other, in the absence of any hydraulic communication through mud seals and/or leakage intermixing potentially between the two compartments. Consequently, these two compartments may be operated in parallel efficiently, or a different kind of feed suspension may be supplied independently to each compartment, or they may be operated in series as in a countercurrent washing operation. Furthermore, either the top compartment or both compartments may be operated in communication with a storage volume for supernatant liquor occupying the top portion of the tank. Liquor storage in this manner is not practical in the above mentioned hydraulically interconnected or balanced tray thickeners, since the varying liquid level of the storage volume would interfere with the control of the unit.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 1a is an embodiment of the feed box of FIG. 1 for supplying pulps of different characteristics.

FIG. 4 is another embodiment of a two-compartment sedimentation tank unit provided with storage space for supernatant in the top compartment of the tank.

Figure 1:
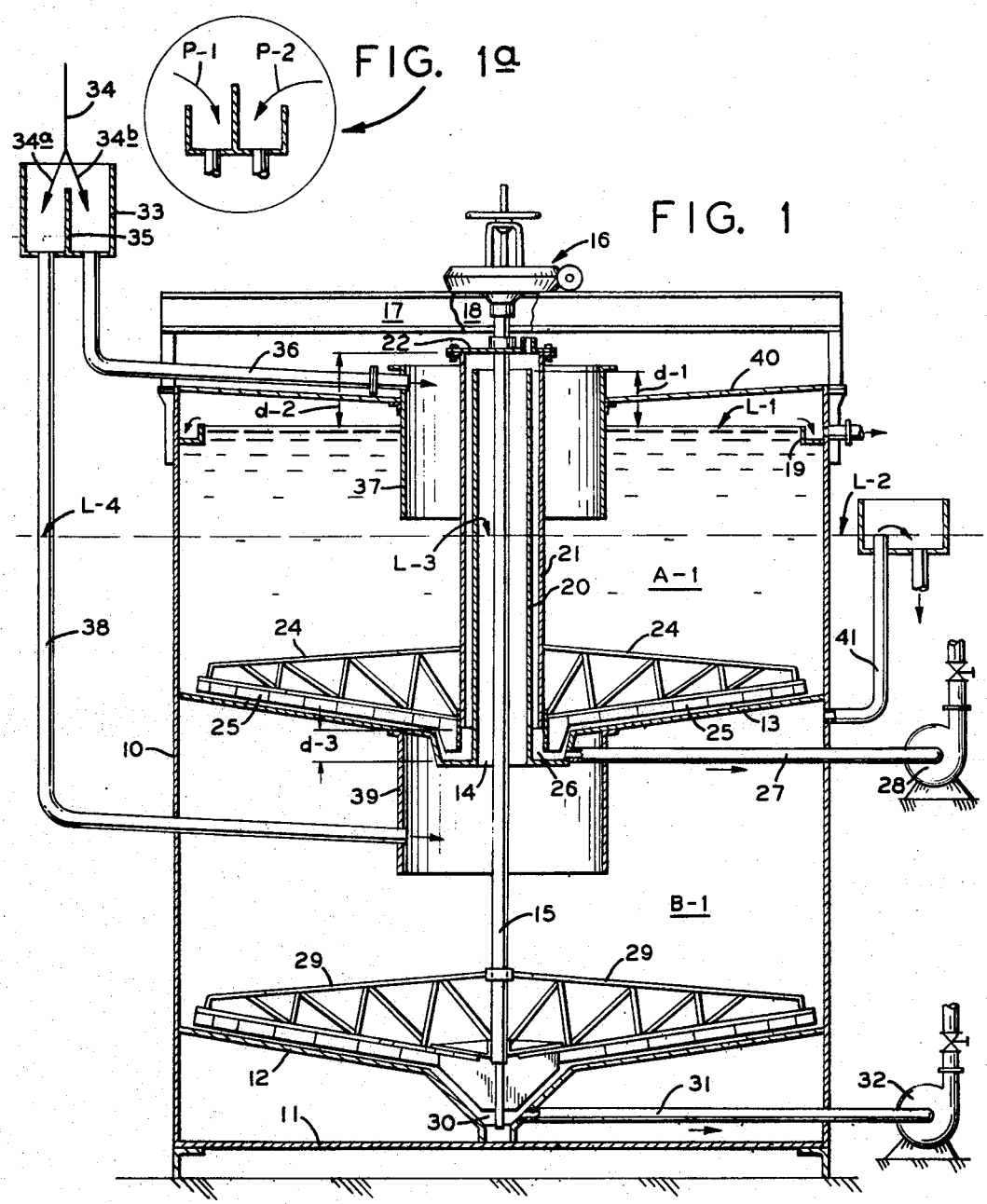
FIG. 1 is a vertical sectional view of one embodiment of a sedimentation tank arranged for parallel operation of the two vertically stacked settling compartments.

In the embodiment of FIG. 1 the settling tank has a cylindrical wall 10 and a horizontal bottom 11. Within the tank there is a lower shallow conical tray 12 and an upper shallow conical tray 13, which trays provide the settling surfaces for an upper settling compartment A–1 and a lower settling compartment B–1 respectively.

The upper tray has a central opening 14 through which freely extends a vertical shaft 15 of a rotary rake structure serving both compartments. The top end of this shaft is connected to and is depending from a drive head 16 mounted on a pair of parallel beams 17 and 18 extending across, and supported by the top end of the tank. Peripheral overflow launder 19 defines the overflow level L–1 for the upper settling compartment.

A sealing device according to this invention to be effective around the shaft and between compartments A–1 and B–1, comprises an upstanding tube 20 and a depending tube 21 surrounding the upstanding tube, both tubes being concentric with the shaft. Tube 20 has its foot end connected to opening 14, and has a free end extending upwardly a distance $d$-1 above the overflow level L–1. The depending tube 21 has a vented closure plate 22 at the top, firmly connecting it to shaft 14 a distance $d$-2 above the liquid level. The lower free end of tube 21 is shown to terminate a distance more $d$-3 above the lower end of the upstanding tube, and guide bearing means may be provided effective between it and the foot end portion of the upstanding tube.

Tube 21 has fixed thereto a set of upper rake arms 24 provided with the usual raking blades 25 for moving sediment or sludge to a central collecting zone or annular sump 26 surrounding the foot end portion of the upstanding tube, for withdrawal through an underflow pipe 27 connected to sludge pump 28. Means are provided for varying or adjusting the sludge withdrawal rate.

Fixed to the lower end of shaft 15 is a lower set of rake arms 29, for moving sediment or sludge to a central collecting zone or sump 30, for withdrawal through underflow pipe 31 connected to a sludge pump 32, with means provided for varying or adjusting the sludge withdrawal rate.

In the embodiment of FIG. 1, in order to operate the settling compartments A–1 and B–1 in parallel independently each substantially in the manner of the initially mentioned single tank operation, there is provided a feed box 33 receiving a feed slurry or suspension of solids 34 by way of a feed splitter 35. In this way, equal amounts 34–$a$ and 34–$b$ of the feed slurry may be delivered to the respective settling compartments, with a feed pipe 36 leading to feedwell 37 in the upper compartment, and a feed pipe 38 leading to feedwell 39 in the lower compartment. The upper feedwell is supported by a tank cover plate 40 while the lower feedwell extends downwardly from the underside of the upper tray 13.

Overflow or supernatant liquor from the lower settling compartment is through an overflow pipe 41 determining the overflow level L–2 for the lower settling compartment, and substantially identical levels L–3 for the upstanding tube, and L–4 in feed pipe 38.

Figure 2:
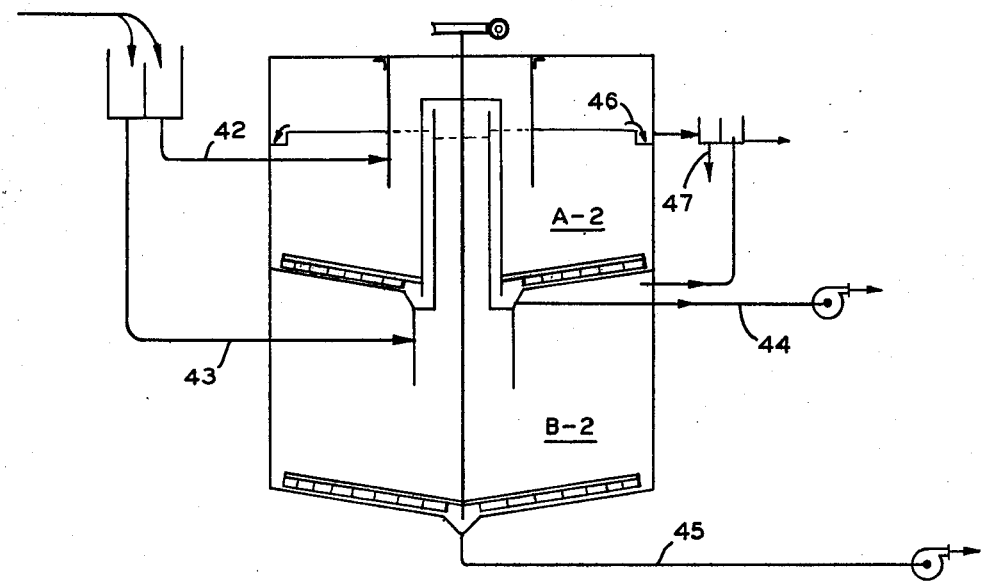
FIG. 2 is a diagrammatic rendition of the parallel operation of the two settling compartments.

FIG. 2, for convenience sake, diagrammatically illustrates the parallel operation just described of the FIG. 1 construction, featuring the concentric tubes of the sealing device which must rise to a distance above the liquid level of the top settling compartment.

Consequently, there are parallel feed lines 42, 43 leading into respective settling compartments A–2 and B–2, with parallel underflow discharge pipes 44 and 45 delivering the sludges from the respective compartments. Overflows 46 and 47 may be delivered from the two compartments separately or jointly.

Figure 3:
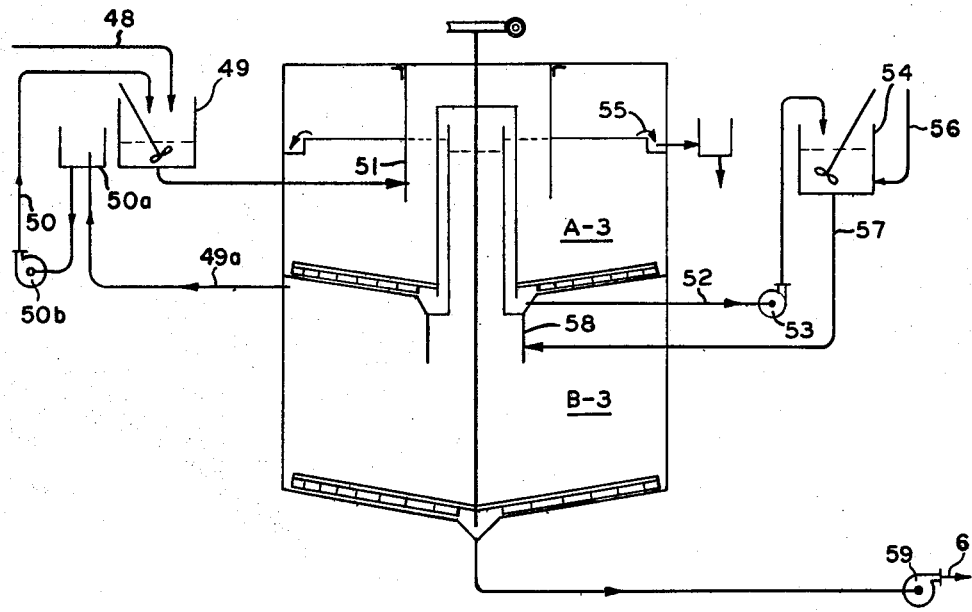
FIG. 3 is a diagrammatic rendition of the series or countercurrent washing operation of the two settling compartments.

FIG. 3 is a diagrammatic showing of the settling tank itself similar to the one in FIG. 2, although it is equipped to allow the two settling compartments to operate in series rather than in parallel. Thus equipped this tank unit may be employed for instance in the countercurrent washing treatment of a sludge whereby the sludge solids are to be washed free of a carrier liquid or mother liquor, for the recovery of either the washed solids or the recovery of a dilute mother liquor, or of both.

Whereas the FIG. 1 embodiment illustrates parallel operation of the two settling compartments with a single source of feed slurry or pulp split into equal shares for the two compartments, FIG. 1–A illustrates a parallel mode of operation whereby pulps P–1 and P–2 of different characteristics may be supplied independently and separately to the respective upper and lower compartments.

Countercurrent washing as illustrated in FIG. 3 is carried out as follows:

A sludge 48 to be washed free of its carrier liquid or mother liquid is fed into a first mixing station 49 for mixing with overflow liquid or supernatant or partially spent wash solution 50 from the lower settling compartment B–3. As shown, this supernatant solution through pipe 49$a$ overflows into box 50$a$ whence it gravitates to pump 50$b$ which lifts and delivers it into the mixing station 49. The mixture from tank 49 is delivered into a feedwell 51 of the upper settling compartment A–3. The resulting sludge 52 from that compartment is delivered through pump 53 at a controlled rate to a second mixing station 54 while spent wash solution for dilute mother liquor overflows at 55. Fresh wash liquid or water 56 is fed into the second mixing station 54, and the resulting mixture 57 is then delivered into the feedwell 58 of the lower settling compartment. Pump 59 delivers the washed sludge solids 60 from the system.

The following is an example of how the parallel operation presented in FIG. 2 and the series or countercurrent washing operation are presented in FIG. 3 may be employed both within the same flow sheet for instance of the paper pulp industry:

Green liquor resulting from the fiber cooking process is subjected to sedimentation in the parallel operating compartments A–2 and B–2 of FIG. 2. The resulting combined sludges from these compartments containing as solids the so-called dregs are then delivered into the first mixing station 49 of FIG. 3, and are consequently subjected to the countercurrent washing operation described above. This results in spent wash liquor or dilute green liquor leaving the top of the upper compartment as overflow 55, while the washed dregs 60 are delivered as sludge from the bottom of the lower compartment of the system.

In the embodiment of FIG. 4 the two settling compartments A–4 and B–4 of the sedimentation tank or unit may be operated either in parallel or in series, substantially in the manner described above for FIGS. 2 and 3 respectively, even though only a tank equipped for parallel operation is here shown. This embodiment, however, differs from that of FIGS. 1 to 3, in that the tank wall is extended upwardly so as to provide a volume V for storing a fluctuating volume of supernatant liquor derived from the sedimentation operation. In this way, there is established in the upper compartment a sedimentation zone Z–1 of constant depth and a superimposed zone Z–2 of stored supernatant liquid of fluctuating depth, all as will be furthermore explained below.

The rotary rake structure serving both setting compartments comprises a vertical shaft 61 connected to and supported from a drive head 62 which is mounted upon beams 63 and 64 extending across the top of the tank. The shaft extends centrally through a tray 65 which separates the upper from the lower settling compartment, and may have guide bearing means between it and the tray.

A sealing device around the shaft is functionally the same as that above described, comprising an inner upstanding tube 67 and an outer depending tube 68, both concentric with the shaft. The foot end of the inner tube is connected to the tray, while the top end of the outer tube is connected to plate or hub member 69 which in turn is fixed to the shaft. Both tubes terminate upwardly a safe distance above the maximum level L-4 to which supernatant liquid may rise within the storage volume V in the tank, as determined by an overflow 70 provided at the top end of the tank.

The depending tube 68 carries an upper set of rake arms 70a for moving sludge into an annular depression or sump 70b surrounding the foot end of the upstanding tube. A lower set of rake arms 70c is fixed to lower end of shaft 61 for moving sludge to central outlet or sump 70d.

The outer tube of the sealing device is in turn surrounded by a tubular feedwell 71 supported from the beams, and having an upper end terminating a distance d-4 above the potential maximum liquid level L-4, and a lower end terminating a suitable distance d-5 above the tray.

Feed pulp 72 supplied to a feed box 73 is divided by way of feed splitter 74 into equal amounts 74a and 74b respectively reaching the upper settling compartment through a feed pipe 75 leading into feedwell 71, and reaching the lower settling compartment through a feed pipe 76 leading into a feedwell 77 extending downwardly from the tray.

Sludge from the upper compartment is withdrawn through an underflow pipe 77a and sludge pump 78 at a controllable rate. Sludge from the lower compartment leaves the tank bottom through an underflow pipe 79 and sludge pump 80 also at a controllable rate.

In the embodiment, in order to allow the tank to accommodate or provide storage for a substantial volume of supernatant liquor resulting from the continuous sedimentation operation, a bustle pipe 81 is provided surrounding the tank, having radial branch pipe connections 82 with the tank for withdrawing supernatant liquor at level L-5 through pump 83 at a controlled rate. Valve 84 at the delivery end of the pump is set to control the supernatant delivery rate so as to be equal to the average or normal rate of feed supply into feed box 73. Theoretically or ideally such an adjusted condition would maintain the liquid level in the tank balanced at L-5 of both compartments.

If the rate of feed supply via feed splitter 74 should increase beyond the rate for which pump 83 is set, this would simply cause the resulting excess volume of supernatant to occupy, say, the zone Z-2 of storage volume V, as the liquid rises to a level L-6. This level will recede when the rate of feed supply drops below average or normal, but would stay constant if the rate of feed supply were sustainable at said average or normal.

In this connection, it will be noted that overflow from the lower settling compartment may be delivered through overflow pipe 86 into overflow box 87 determining an oveflow level L-7, irrespective of feed rate fluctuations, with an overflow discharge valve 88 remaining open. Yet, supernatant from the lower settling compartment may also be stored in the tank by opening a valve 89 provided in a branch pipe 90 connecting overflow pipe 86 with the tank at a suitable level for instance level L-8. As an alternative to such a storage operation, valves 88 and 89 may be closed, while a valve 91 is opened to allow supernatant to be delivered from the overflow box through a pipe connection 92 into the upper end portion of the tank, for joint storage with supernatant from the upper settling compartment.

I claim:
1. Sedimentation apparatus having a plurality of vertically stacked settling compartments which comprises,
   a tank,
   a tray structure dividing the tank into a top sedimentation compartment, said tray structure having a central opening, said top compartment having first supply means for introducing feed suspension, first discharge means for withdrawing sludge from the bottom zone of the compartment, and first overflow outlet means determining the overflow level of clarified liquid from the clarification zone of said compartment, the subjacent compartment having second supply means for introducing feed suspension, second discharge means for withdrawing sludge from the bottom zone of said compartment, and second overflow outlet means determining the overflow level of clarified liquid from the clarification zone of said compartment,
   an upstanding inner tube having its foot end connected to said central opening and communicating with the interior of said subjacent compartment, and extending upwardly to a point higher than both said first and second overflow outlet means,
   a vertical shaft extending freely through said upstanding tube into said subjacent compartment,
   a depending outer tube surrounding said upstanding inner tube, and having its upper end fixed to said shaft at a point above the upper end of said upstanding tube and constituting therewith an annular space, and having its lower end communicating with the sludge zone of said top compartment, the arrangement of said tubes relative to each other and relative to said overflow levels being such as to preclude hydraulic communication between a column of clarified liquid from said subjacent compartment rising in said inner tube and a column of sludge from said top compartment rising in said annular space between the inner and outer tubes,
   upper sludge rake means carried by said outer depending tube for moving sludge on said tray structure to a collecting zone for withdrawal through said first discharge means incident to rotation of said shaft,
   lower sludge rake means carried by said shaft in said subjacent compartment for moving sludge to a collecting zone for withdrawal through said second discharge means incident to rotation of said shaft,
   and means for rotating said shaft.

2. The apparatus according to claim 1, provided with means arranged for the operation of said settling compartments in parallel.

3. The apparatus according to claim 1, provided with means arranged for the operation of said settling compartments in series and for effecting the countercurrent washing of a feed suspension supplied to said top compartment.

4. The apparatus according to claim 1, wherein there is provided a conduit leading from the clarification zone of the lower settling compartment to the clarification zone of the upper settling compartment, so that said overflow means of the top compartment determines the overflow level of both the top compartment and the subjacent compartment.

5. Sedimentation apparatus having a plurality of vertically stacked settling compartments, which comprises,
   a cylindrical tank,
   a tray structure having a central opening dividing said tank into a lower settling compartment, and an upper settling compartment of a depth much greater than that of the lower compartment, and great enough to provide therein not only a settling zone comparable to that available in said lower compartment but also a superjacent storage zone of substantial depth for holding supernatant liquor, overflow means for said storage zone determining a potential maximum liquid level of said storage zone, feed supply means for said lower settling compartment, overflow delivery means for the supernatant from said lower settling compartment, lower sludge withdrawal means for discharging sludge from said lower settling compartment, feed supply means for said upper compartment, delivery means for withdrawing supernatant liquid at a controlled rate from the top of said settling zone of the upper settling compartment, thereby defining the depth of said settling zone relative to said superjacent storage zone, upper sludge withdrawal means for discharging sludge from said upper settling compartment, an upstanding inner tube having its foot end connected to said central opening and communicating with the interior of said lower settling compartment, and extending upwardly to a point higher than both said overflow means of said storage zone and of said lower settling compartment, a vertical shaft extending freely through said upstanding tube into said subjacent compartment, a depending outer tube surrounding said upstanding inner tube and constituting therewith an annular space, and having its upper end fixed to said shaft at a point above the upper end of said upstanding tube, and having its lower end communicating with the sludge zone of said upper settling compartment, the arrangement of said tubes relative to each other and relative to said overflow levels being such as to preclude hydraulic communication between a column of supernatant liquid from said lower settling compartment rising in said inner tube, and a column of sludge from said upper settling compartment rising in said annular space between the inner and outer tubes, upper sludge rake means carried by said depending tube for moving sludge on said tray structure to a collecting zone for discharge through said upper sludge withdrawal means, lower sludge rake means carried by said shaft in said lower settling compartment for moving sludge to a collecting zone for discharge through said lower sludge withdrawal means incident to rotation of said shaft, and means for rotating said shaft.

6. The apparatus according to claim 5, wherein said supernatant delivery means for the lower settling compartment comprises communicating duct means leading from said lower compartment to said storage zone.

7. The apparatus according to claim 6, wherein said duct means comprise a by-pass pipe connection.

8. The apparatus according to claim 5, wherein said overflow delivery means for the supernatant from said lower settling compartment comprises a flow connection between said overflow means and said storage zone, said overflow means and said flow connection being constructed and arranged for allowing overflow liquid from said overflow means to pass into said storage zone.

9. The apparatus according to claim 5, wherein said feed supply means for said upper settling compartment comprise a tubular feed well extending upwardly to a point above said maximum liquid level of said storage zone.

References Cited

UNITED STATES PATENTS

| | | | |
|---|---|---|---|
| 2,344,355 | 3/1944 | Harms | 210—522 |
| 2,402,649 | 6/1946 | Logue | 210—522 X |

JAMES L. DECESARE, Primary Examiner

U.S. Cl. X.R.

210—528